United States Patent [19]
Fujii et al.

[11] Patent Number: 5,424,765
[45] Date of Patent: Jun. 13, 1995

[54] SCANNING DEVICE WITH RESONANT LIGHT REFLECTOR

[75] Inventors: Takeshi Fujii; Kaoru Ohno, both of Kanagawa, Japan

[73] Assignee: Fuji Photo Film Co., Ltd., Kanagawa, Japan

[21] Appl. No.: 281,086

[22] Filed: Jul. 27, 1994

[30] Foreign Application Priority Data

Aug. 2, 1993 [JP] Japan .................................. 5-191260

[51] Int. Cl.6 .................................................. B41J 2/47
[52] U.S. Cl. ..................................... 347/248; 347/260
[58] Field of Search ................ 346/108, 107 R, 76 L, 346/160, 109; 359/197, 98, 199, 223, 225

[56] References Cited

U.S. PATENT DOCUMENTS

| | | | |
|---|---|---|---|
| 3,953,859 | 4/1976 | Locke | 346/1 |
| 4,926,263 | 5/1990 | Yokota | 358/474 |
| 4,990,763 | 2/1991 | Shinada | 250/205 |
| 4,992,655 | 2/1991 | Shelander | 250/235 |
| 5,221,933 | 6/1993 | Chandler et al. | 346/109 |

FOREIGN PATENT DOCUMENTS 0021831 1/1981 European Pat. Off. ........ H04N 1/36
WO92/22109 12/1992 WIPO .................... H02S 3/10

*Primary Examiner*—Mark J. Reinhart
*Attorney, Agent, or Firm*—Sughrue, Mion, Zinn, Macpeak & Seas

[57] ABSTRACT

An oscillation detector circuit detects an oscillating condition of a resonant light deflector having a reflecting mirror, and applies an oscillating condition signal to a reference signal generator, which generates a reference signal. An auxiliary scanning feed motor for feeding a scanned medium in an auxiliary scanning direction is controlled by the reference signal to adjust the speed at which the scanned medium is fed in the auxiliary scanning direction, depending on the oscillating condition of the resonant light deflector.

3 Claims, 2 Drawing Sheets

SCANNING DEVICE WITH RESONANT LIGHT REFLECTOR

BACKGROUND OF THE INVENTION

1. Field of the Invention

The present invention relates to a scanning device with a resonant light deflector for recording data on and reading data from a scanned medium highly accurately by controlling the speed at which the scanned medium is fed in an auxiliary scanning direction depending on a frequency variation caused as by a change in the temperature of the resonant light deflector.

2. Description of the Related Art

Laser beam printers for recording an image or the like by deflecting a laser beam at high speed on a scanned medium such as a photographic film are used in various applications. The laser beam may be deflected at high speed by a resonant light deflector which comprises a reflecting mirror supported by a resilient member and oscillatable at its natural frequency.

Because the natural frequency of the resilient member varies with temperature, the resonant light deflector has a resonant frequency as shown in FIG. 2 of the accompanying drawings. The temperature of the resonant light deflector varies with an ambient temperature and due to the heat produced thereby. The resonant frequency of the resonant light deflector cannot be adjusted since it is based on the natural frequency of the resilient member.

There is known a scanning device in which an image is recorded on a scanned medium such as a photographic film using such a resonant light deflector. If a scanned medium is fed in an auxiliary scanning direction at a constant speed in such a scanning device, the scanning pitch in the auxiliary scanning direction is varied by a change in the frequency of the resonant light deflector, resulting in irregularities in the recorded image. To alleviate such a drawback, it has been proposed to oscillate the resonant light deflector for a certain period of time without recording any image after the scanning device has been started, or to preheat the resonant light deflector until it is kept at a constant temperature for thereby stabilizing the resonant frequency.

However, these proposals make the scanning device inefficient since no recording process can be carried out until the resonant frequency is stabilized. In addition, the attempts fail to avoid irregularities which are produced in the recorded image due to temperature changes while the scanning device is in recording operation.

SUMMARY OF THE INVENTION

It is therefore an object of the present invention to provide a scanning device with a resonant light deflector which is capable of stably scanning a scanned medium without disturbing the scanning pitch of a light beam even when the resonant frequency of the resonant light deflector fluctuates, and of starting a desired scanning process immediately after the scanning device is started, for thereby allowing the scanning device to operate highly efficiently.

According to the present invention, there is provided a scanning device comprising light beam generating means for generating a light beam, a resonant light deflector having a reflecting mirror for reflecting and deflecting the light beam generated by the light beam generating means to scan a scanned medium in a main scanning direction, feed means for feeding the scanned medium in an auxiliary scanning direction transverse to the main scanning direction, detecting means for detecting an oscillating condition of the reflecting mirror and producing an oscillating condition signal indicative of the detected oscillating condition, reference signal generating means for generating a reference signal in synchronism with or proportion to the frequency of the oscillating condition signal from the detecting means, and feed control means for controlling the feed means to control a speed at which the scanned medium is fed in the auxiliary scanning direction, in synchronism with or proportion to the reference signal.

The reference signal generating means may comprise a phase-locked loop for generating the reference signal in response to the oscillating condition signal.

The detecting means may comprise means for generating the oscillating condition signal based on a feedback signal from the resonant light deflector.

In the scanning device of the above arrangement, an oscillating condition of the reflecting mirror of the resonant light deflector is detected by the detecting means, and the reference signal generating means generates a reference signal in synchronism with or proportion to the oscillating condition signal. The feed control means controls the speed at which the scanned medium is fed in the auxiliary scanning direction, in synchronism with or proportion to the reference signal. At the same time, the light beam is scanned over the scanned medium in the main scanning direction by the resonant light deflector for recording an image on or reading an image from the scanned medium. Since the speed at which the scanned medium is fed in the auxiliary scanning direction is adjusted as the resonant frequency of the resonant light deflector varies, the image can be recorded on and read from the scanned medium at a constant scanning pitch.

Inasmuch as no special means for stabilizing the resonant frequency of the resonant light deflector is required, the scanning device is relatively simple in structure.

As it is possible to start scanning the light beam immediately after the resonant light deflector has started being actuated, the scanning device is relatively efficient for recording or reading images.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
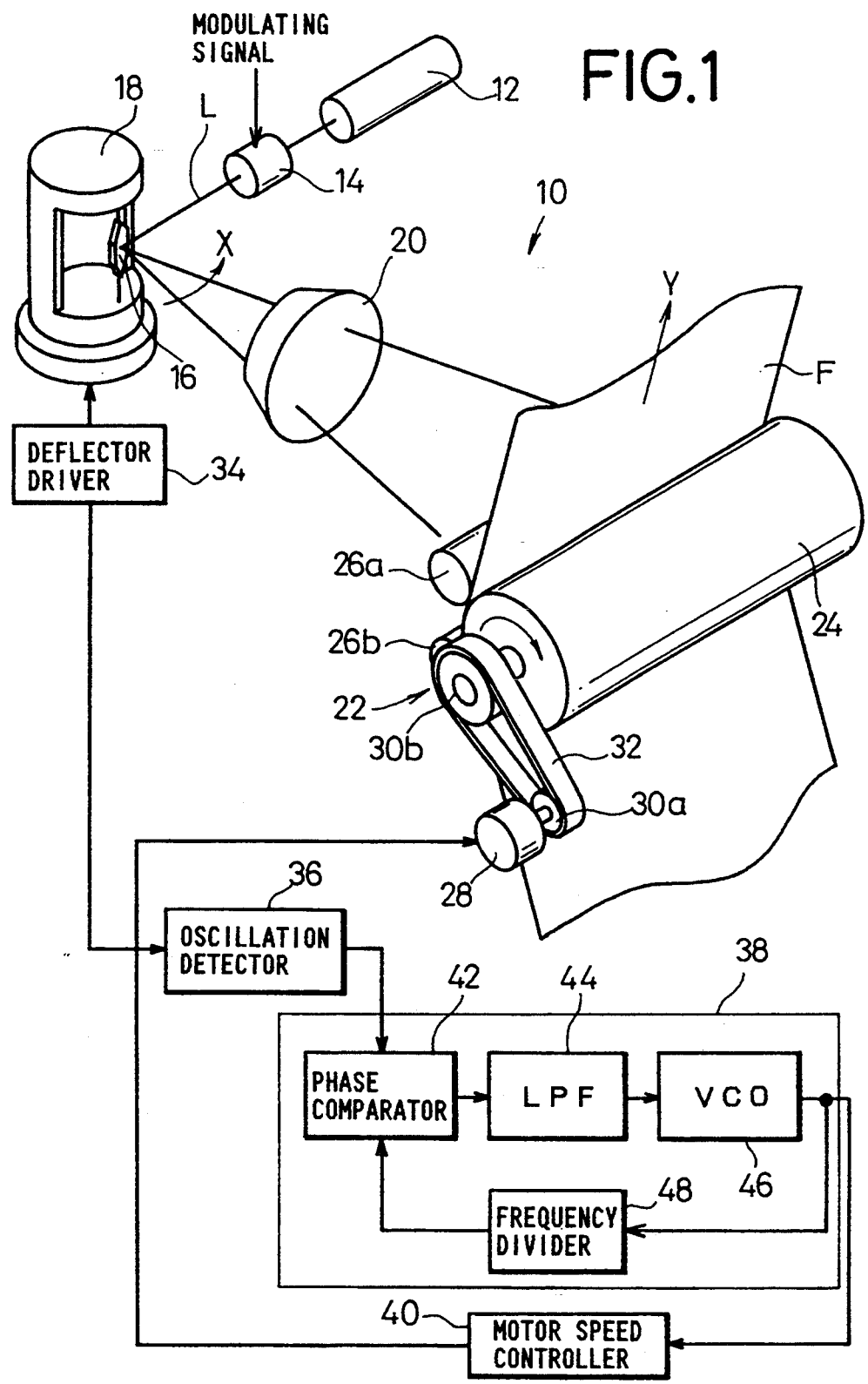
FIG. 1 is a schematic perspective view, partly in block form, of an image recording apparatus which incorporates a scanning device with a resonant light deflector according to the present invention.

As shown in FIG. 1, an image recording apparatus 10 records an image on a photographic film F by applying a laser beam L to the film F in a main scanning direction indicated by the arrow X while the film F is being fed in an auxiliary scanning direction indicated by the arrow Y which is substantially perpendicular to the main scanning direction X. The image recording apparatus 10 has a laser oscillator 12 (light beam generating means) for outputting the laser beam L, an acousto-optic modulator (AOM) 14 for modulating the laser beam L with a modulating signal based on image information, a resonant light deflector 18 for deflecting the laser beam L in the main scanning direction X with a reflecting mirror 16 which is oscillated at a natural frequency thereof, and a feed mechanism 22 (feed means) for feeding the film F in the auxiliary scanning direction Y. The feed mechanism 22 comprises a drum 24 and a pair of nip rollers 26a, 26b for sandwiching the film F therebetween, an auxiliary scanning feed motor 28 for rotating the drum 24 to feed the film F in the auxiliary scanning direction Y, and a pair of pulleys 30a, 30b and a belt 32 trained therearound for transmitting drive forces from the auxiliary scanning feed motor 28 to the drum 24.

The resonant light deflector 18 comprises a reflecting mirror 16 which is oscillated under drive forces of an actuating coil (not shown) based on a drive signal supplied from a deflector driver circuit 34. A feedback signal representing a drive signal which is supplied to the actuating coil is supplied from the deflector driver circuit 34 to an oscillation detector circuit 36. The oscillation detector circuit 36 produces a signal indicating the oscillating condition of the reflecting mirror 16, and supplies the produced signal to a reference signal generator 38 (reference signal generating means), which generates a reference signal. The reference signal is supplied to a motor speed controller 40, which controls the auxiliary scanning feed motor 28 based on the supplied reference signal. The reference signal generator 38 comprises a phase-locked loop (PLL) composed of a phase comparator 42, a low-pass filter 44, a voltage-controlled oscillator 46, and a frequency divider 48.

Operation of the image recording apparatus 10 will be described below.

When a sine-wave drive current is supplied to the actuating coil of the deflector driver circuit 34, the actuating coil generates a magnetic field which starts to oscillate the reflecting mirror 16. At this time, the deflector driver circuit 34 is controlled by a feedback loop for oscillating the reflecting mirror 16 in resonance with the natural frequency of a resilient support member (not shown) which supports the reflecting mirror 16.

A feedback signal from the deflector driver circuit 34 is applied to the oscillation detector circuit 36. The oscillation detector circuit 36 generates an oscillating condition signal from the feedback signal, which is of a sine wave, with a certain slice level, and applies the oscillating condition signal to the phase comparator 42 of the reference signal generator 38. The phase comparator 42 compares the phase of the oscillating condition signal and the phase of an output signal from the voltage-controlled oscillator 46, whose frequency has been divided into 1/N by the frequency divider 48. The phase comparator 42 applies a voltage signal indicative of the phase difference between the oscillating condition signal and the output signal from the voltage-controlled oscillator 46, to the low-pass filter 44. The low-pass filter 44 smoothes the voltage signal and applies the smoothed voltage signal as a control voltage to the voltage-controlled oscillator 46. The voltage-controlled oscillator 46 produces an output signal which is supplied to the motor speed controller 40 as a reference signal that is synchronous with the average frequency of the oscillating condition signal that is applied from the oscillation detector circuit 36 to the reference signal generator 38. The voltage-controlled oscillator 46 produces an output signal which is supplied to the motor speed controller 40 as a reference signal thereof. The output signal from the voltage-controlled oscillator 46 is in synchronism with and an N-multiplication of the average frequency of the oscillating condition signal applied to the reference signal generator 38 from the oscillation detector circuit 36.

The motor speed controller 40 supplies a drive signal in synchronism with or proportion to the reference signal to the auxiliary scanning feed motor 28, thereby energizing the auxiliary scanning feed motor 28. The drive forces generated by the auxiliary scanning feed motor 28 are transmitted through the pulley 30a, the belt 32, and the pulley 30b to the drum 24, which is then rotated about its own axis. The film F which is sandwiched between the drum 24 and the nip rollers 26a, 26b is now fed in the auxiliary scanning direction Y depending on the oscillating condition of the reflecting mirror 16.

The laser beam L emitted from the laser oscillator 12 is modulated in intensity by the acousto-optic modulator 14 based on desired image information. The modulated laser beam L is then deflected by the reflecting mirror 16 of the resonant light deflector 18, and applied through an fΘ lens 20 to a portion of the film F between the nip rollers 26a, 26b while scanning the film F in the main scanning direction X. As a result, a two-dimensional image is recorded on the film F by the laser beam L which has been modulated based on the image information.

Figure 2:
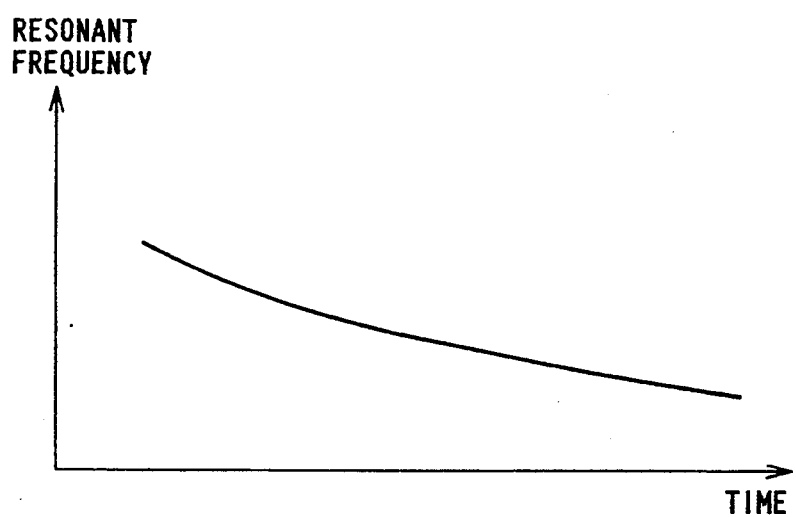
FIG. 2 is a diagram illustrative of how the resonant frequency of the resonant light deflector varies with time.

The resonant light deflector 18 is heated after the reflecting mirror 16 has started to oscillate. Therefore, the natural frequency of the resilient support member which supports the reflecting mirror 16 varies, and the resonant frequency of the resonant light deflector 18 varies with time as shown in FIG. 2. The resonant frequency of the resonant light deflector 18 is also varied by a change in an ambient temperature around the image recording apparatus 10. When the resonant frequency of the resonant light deflector 18 varies, the feedback signal supplied from the deflector driver circuit 34 to the oscillation detector circuit 36 also varies.

The reference signal generator 38 generates a reference signal based on an oscillating condition signal which is generated by the oscillation detector circuit 36 based on the feedback signal, and supplies the generated reference signal to the motor speed controller 40 for thereby controlling the rotational speed of the auxiliary scanning feed motor 28. Therefore, the rotational speed of the auxiliary scanning feed motor 28 varies as the resonant frequency of the reflecting mirror 16 varies. More specifically, when the resonant frequency of the reflecting mirror 16 increases, the frequency of the oscillating condition signal supplied from the oscillation detector circuit 36 to the reference signal generator 38 increases. Therefore, the frequency of the reference signal increases, thus increasing the rotational speed of the auxiliary scanning feed motor 28, so that the speed at which the film F is fed increases. When the resonant frequency of the reflecting mirror 16 decreases, the speed at which the film F is fed also decreases correspondingly. As a result, irrespective of changes in the resonant frequency of the reflecting mirror 16, the scanning pitch of the laser beam L on the film F in the auxiliary scanning direction Y is rendered constant at all times, allowing an image to be recorded highly accurately on the film F. Inasmuch as the film F is fed in the auxiliary scanning direction Y at a speed commensurate with the resonant frequency of the reflecting mirror 16, it is possible to start recording a desired image on the film F immediately after the reflecting mirror 16 has started oscillating. The available scanning time of the image recording apparatus 10 can therefore be utilized efficiently, thereby making the image recording apparatus 10 efficient for recording images.

In the illustrated embodiment, the oscillating condition signal indicative of the oscillating condition of the reflecting mirror 16 is produced based on the drive current which is supplied to the actuating coil of the deflector driver circuit 34. However, a certain spot scanned by the laser beam L that has passed through the fΘ lens may be detected by a light detector, an oscillating condition signal indicative of an oscillating condition of the reflecting mirror 16 may be produced from a detected signal from the light detector, and the produced oscillating condition signal may be applied to the phase comparator 42 for the generation of a reference signal.

The scanning device with the resonant light deflector according to the present invention may be incorporated in an image recording apparatus such as a laser beam printer, a plotter, a copying machine, or the like, and may also be incorporated in an image reading apparatus which employs a light beam.

Although a certain preferred embodiment of the present invention has been shown and described in detail, it should be understood that various changes and modifications may be made therein without departing from the scope of the appended claims.

What is claimed is:

1. A scanning device comprising:
  light beam generating means for generating a light beam;
  a resonant light deflector having a reflecting mirror for reflecting and deflecting the light beam generated by said light beam generating means to scan a scanned medium in a main scanning direction;
  feed means for feeding said scanned medium in an auxiliary scanning direction transverse to said main scanning direction;
  detecting means for detecting an oscillating condition of said reflecting mirror and producing an oscillating condition signal indicative of the detected oscillating condition;
  reference signal generating means for generating a reference signal in synchronism with or proportion to the frequency of the oscillating condition signal from said detecting means; and
  feed control means for controlling said feed means to control a speed at which said scanned medium is fed in said auxiliary scanning direction, in synchronism with or proportion to said reference signal.

2. A scanning device according to claim 1, wherein said reference signal generating means comprises a phase-locked loop for generating said reference signal in response to said oscillating condition signal.

3. A scanning device according to claim 1, wherein said detecting means comprises means for generating said oscillating condition signal based on a feedback signal from said resonant light deflector.

* * * * *

UNITED STATES PATENT AND TRADEMARK OFFICE
CERTIFICATE OF CORRECTION

PATENT NO.   : 5,424,765
DATED        : June 13, 1995
INVENTOR(S)  : Takeshi Fujii et al.

It is certified that error(s) appears in the above-identified patent and that said Letters Patent is hereby corrected as shown below:

On title page item [54] and col. 1, line 2, title, please change "SCANNING DEVICE WITH RESONANT LIGHT REFLECTOR" to --SCANNING DEVICE WITH RESONANT LIGHT DEFLECTOR--.

Signed and Sealed this

Seventh Day of November, 1995

Attest:

BRUCE LEHMAN

*Attesting Officer*  *Commissioner of Patents and Trademarks*